United States Patent [19]

Stirling et al.

[11] Patent Number: 5,004,484

[45] Date of Patent: Apr. 2, 1991

[54] AIR STRIPPING OF LIQUIDS USING HIGH INTENSITY TURBULENT MIXER

[75] Inventors: Thomas E. Stirling, Sugarloaf; John R. Ackerman, Hazleton, both of Pa.

[73] Assignee: Barrett, Haentjens & Co., Hazleton, Pa.

[21] Appl. No.: 364,588

[22] Filed: Jun. 12, 1989

Related U.S. Application Data

[63] Continuation-in-part of Ser. No. 238,474, Aug. 31, 1988, abandoned.

[51] Int. Cl.[5] .............................................. B01D 19/00
[52] U.S. Cl. ........................................... 55/53; 55/94;
55/196; 210/767; 210/188; 261/76; 261/152;
261/DIG. 75
[58] Field of Search ............... 210/750, 767, 774, 150,
210/177, 180, 188; 261/76, 152, 150, DIG. 75;
55/53, 94, 196; 366/150, 165, 167, 173, 176,
177; 137/888, 896

[56] References Cited

U.S. PATENT DOCUMENTS

| | | | |
|---|---|---|---|
| 2,579,282 | 12/1951 | Vicard | 55/94 |
| 2,937,141 | 5/1960 | Helwig | 55/53 |
| 3,653,182 | 4/1972 | Welch | 55/53 |
| 3,954,921 | 5/1976 | Yoshida et al. | 261/DIG. 75 |
| 4,474,477 | 10/1984 | Smith et al. | 366/165 |
| 4,761,077 | 8/1988 | Werner | 366/165 |

FOREIGN PATENT DOCUMENTS

| | | |
|---|---|---|
| 2035814 | 6/1980 | United Kingdom . |
| 2038648 | 7/1980 | United Kingdom . |

*Primary Examiner*—Stanley Silverman
*Assistant Examiner*—Christopher Upton
*Attorney, Agent, or Firm*—Hill, Van Santen, Steadman & Simpson

[57] ABSTRACT

A system and method of removing dissolved gases and volatile organic chemicals from a water supply is provided. Water is supplied under pressure to a contacting chamber in a manner wherein it causes air to be aspirated into the chamber for turbulent contacting with the water. The air and water are directed through the contacting chamber in a common axial direction. Either the water or air may be heated prior to introduction to the contacting chamber to enhance the effectiveness of the dissolved gases and volatile organic chemicals removal.

19 Claims, 2 Drawing Sheets

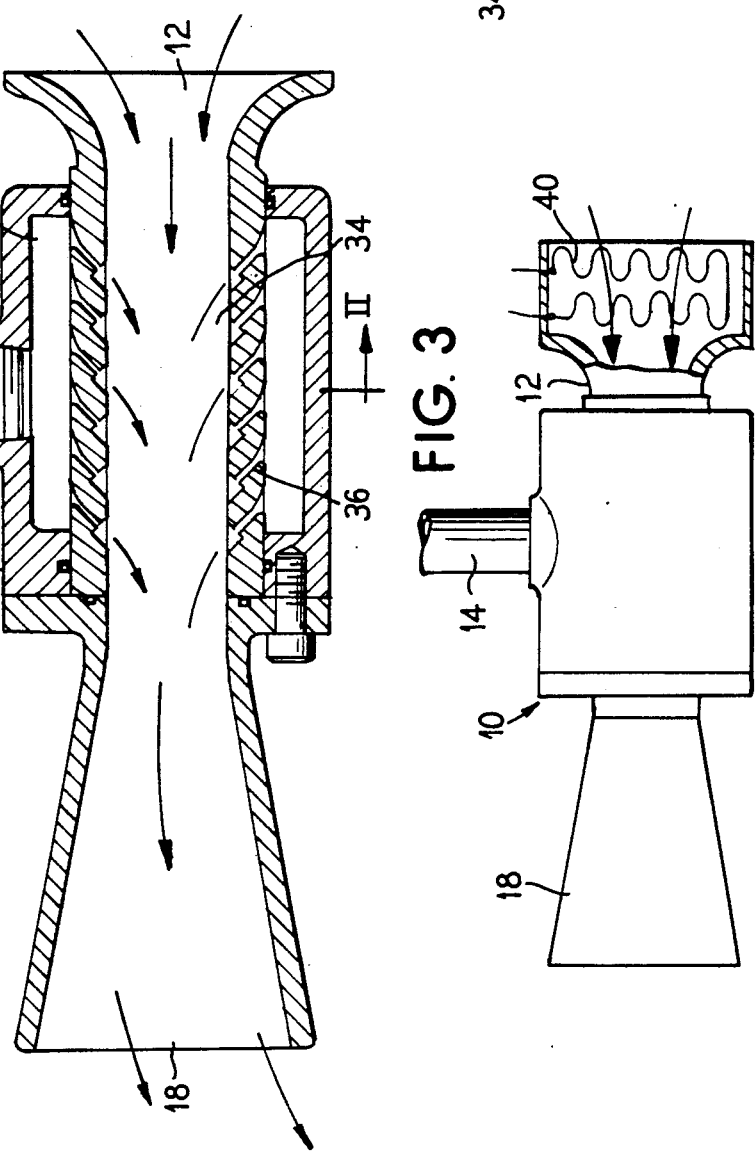
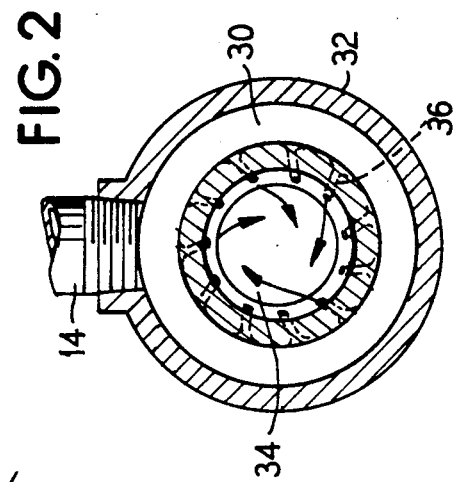
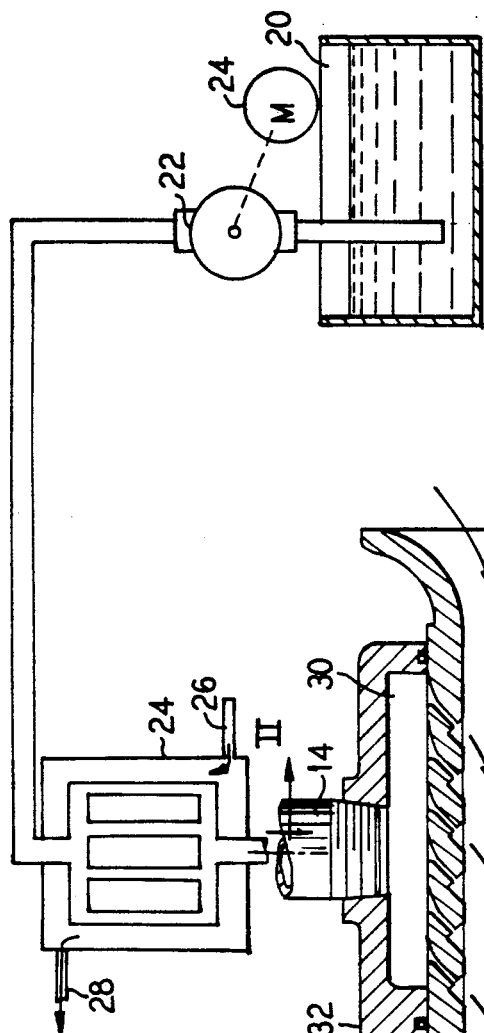
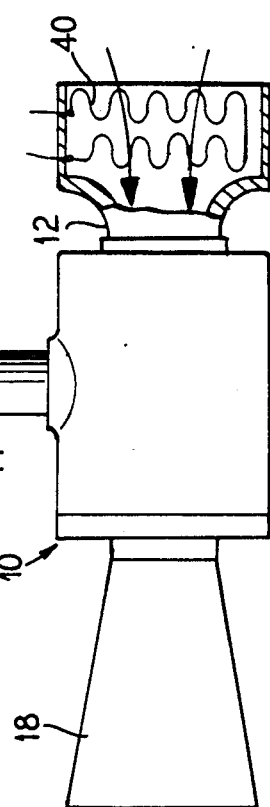
FIG. 1
FIG. 2
FIG. 3

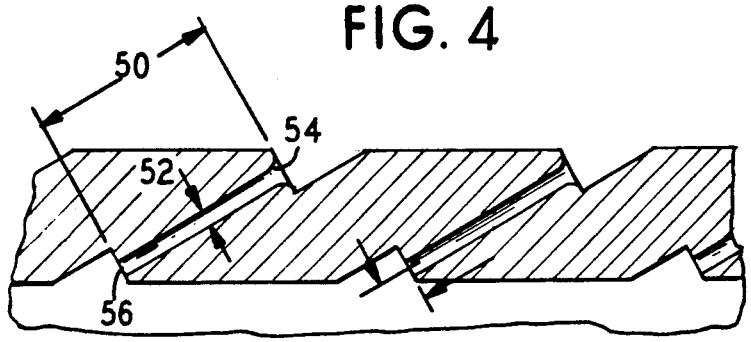
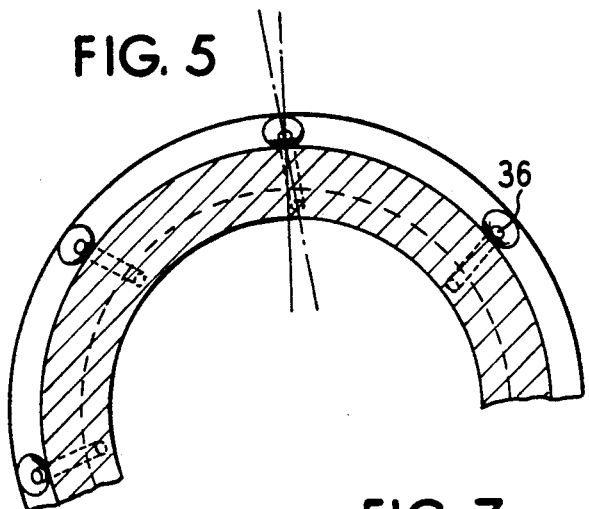
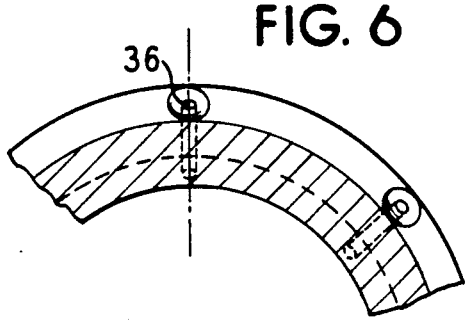
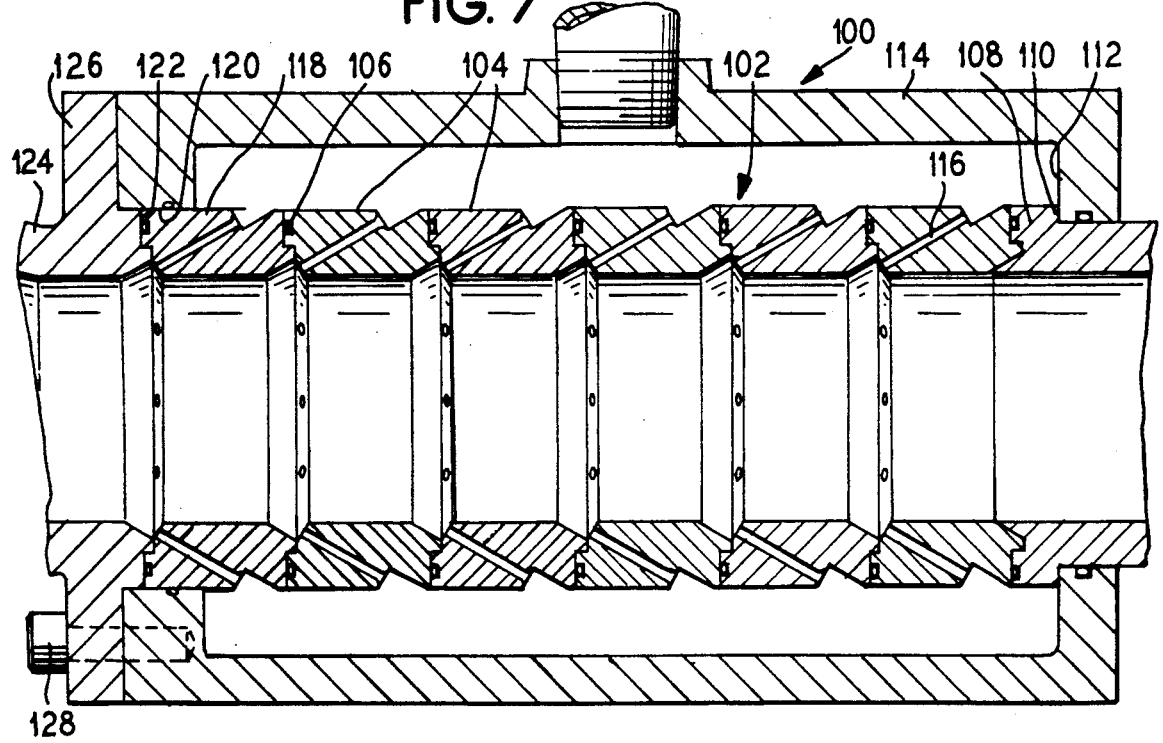

1

AIR STRIPPING OF LIQUIDS USING HIGH INTENSITY TURBULENT MIXER

BACKGROUND OF THE INVENTION

This application is a continuation-in-part of Ser. No. 238,474 filed Aug. 31, 1988, now abandoned.

The present invention relates to a method and apparatus of air stripping liquids and more specifically to a method of air stripping liquids using a high intensity turbulent mixer.

Contamination in ground water wells and surface water supply such as rivers, streams and lakes by both natural occurring volatile organic and inorganic gases such as methane, sulfur dioxide carbon dioxide, chlorine and radon, as well as man-made organic chemicals such as trichloroethane, tetrachloroethylene, etc. can be removed by a process called "air stripping". This generally consists of a process involving a high tower, in which the water to be freed of dissolved gases is percolated through a series of baffles while outside air is blown through the tower in a counter-flow direction. This process is relatively expensive since a high tower is needed in order to provide sufficient time and sufficient air contact with all of the water.

The process of air stripping is discussed in an article in Water/Engineering and Management dated February, 1988 which states that the packed tower aeration has been designated by the EPA as the best available technology for removal of all regulated volatile organic compounds.

SUMMARY OF THE INVENTION

The present invention provides an apparatus and method for removing volatile organic compounds and dissolved gases from liquids in which a contacting device improved upon that described in U.S. Pat. No. 4,761,077 can be used in a system to aspirate a high volume of air to be contacted with the water within the contacting device. In the contacting device, there is an annular jacket surrounding the contacting chamber into which water under pressure is supplied. Although this arrangement requires that the water be supplied under pressure, a comparable pressure is also required for the conventional packed tower in that the tower is of considerable height and there is pressure required to send the water to the top of the tower and preferably to cause a spray of water at that height.

A central portion of the contacting device is a contacting chamber which includes an air inlet. The annular chamber communicates with the contacting chamber through a plurality of small injection holes angled with respect to the center line of the bore of the contacting chamber. The angles of the holes need not be skewed with respect to the perpendicular, as with the devices described previously, to effect turbulent and thorough mixing of the liquid and air streams. The spray of liquid in the contacting chamber is directed toward a discharge opening and thereby causes an aspiration of a high volume of air from an inlet opening. Therefore, pressurized introduction of the air, either by a blower or air compressor is not required, but can be used without detrimental effect. Under proper operating conditions, air volume to liquid volume ratios will exceed 15 to 1.

It has been determined that the effectiveness of this system and method is directly temperatured dependent for some species. Thus, either the liquid entering the system can be preheated, or the air entering the system could be preheated.

Therefore, the present method of supplying liquid under pressure into a contacting chamber with a high volume of air will substantially reduce the costs involved in air stripping while maintaining a high degree of effectiveness. Further, the volume of liquid treatable in a given period of time can be increased over the slow drip method of the conventional packed tower.

BRIEF DESCRIPTION OF THE DRAWINGS

FIG. 1 is a schematic side sectional view of a contacting device incorporating the principles of the present invention.

FIG. 2 is a side sectional view of the contacting device taken generally along the lines II—II of FIG. 1.

FIG. 3 is an elevational view of the contacting device of FIG. 1 employing an air heater.

FIG. 4 is a partial side sectional view of the wall of the contacting chamber showing the nozzles in detail.

FIG. 5 is a sectional view taken through the nozzle area illustrating some nozzles that are both angled and skewed to the perpendicular of the axis.

FIG. 6 is a sectional view taken through the nozzle area illustrating some nozzles that are angled only.

FIG. 7 illustrates an alternative embodiment of the construction of the contacting device wherein the contacting chamber is constructed of a plurality of rings.

DETAILED DESCRIPTION OF THE PREFERRED EMBODIMENTS

In FIG. 1 there is illustrated a contacting device generally at 10 which is an improvement over the devices disclosed in U.S. Pat. Nos. 4,474,477 and 4,761,077. The contacting device has an inlet 12 at the rear of the contactor for receiving a continuous flow of air, either aspirated (in a preferred embodiment) or pressurized, an inlet 14 for receiving a continuous flow of liquid under pressure, and an outlet 18 for the air and liquid mixture. The liquid is supplied to the inlet 14 from a liquid source 20 and, a pump 22 operated by a motor 24 pressurizes the liquid supply, or a sufficient static head is arranged, so that the inlet 14 is supplied with liquid under pressure. In one embodiment, a liquid heating means 25 which may be in the form of a multiple tube liquid heater having an inlet 26 for a heated fluid and an outlet 28 for the fluid which has given off its heat to the water flowing through the multiple tubes of the heater.

The liquid under pressure is supplied to an annular chamber 30 formed by a jacket 32 surrounding a contacting chamber 34. A plurality of passages 36, angled to the centerline of the contacting chamber 34, some of which may also be skewed with respect to the perpendicular as shown in FIG. 5, lead from the annular chamber 30 to the mixing chamber 34. The passages 36 need not be skewed with respect to the perpendicular as illustrated in FIG. 6, however, if desired, some may be as illustrated in FIG. 5. The configuration and orientation of these passages results in a plurality of individual cone shaped jets moving in a turbulent flow of liquid axially toward the outlet 18. Additionally, turbulent flow within each individual jet also caused by the configuration and orientation of the passages increases the relative surface area by producing more and smaller liquid droplets than in previously available devices. The gross motion of the liquid flow causes an aspiration of air through the inlet 12 axially into the contacting chamber where there is a high intensity of mixing and subsequent contacting of the air and liquid streams as they both move in the same axial direction. The configuration and number of passages affects the volume of air aspirated and, under preferred operating conditions, the air volume to liquid volume ratio exceeding 15 to 1 results in a high percentage removal of the contaminants from the liquid stream on a single pass of the liquid through the contacting device. It is also possible to increase the percentage removal of contaminants by passing the stream of liquid through a contacting chamber more than once to contact uncontaminated air more than one time. This could be accomplished by directing the stream through a single contacting chamber a plurality of times, or using a plurality of contacting chambers serially.

In addition, the present invention uses a new nozzle geometry, as best seen in FIGS. 4–7, that significantly increases the fluid turbulence levels. This has been achieved partly by the nozzle configuration and partly by using nozzles with a high length to diameter ratio (in excess of 10:1). Thus, as shown in FIG. 4, a length 50 is more than 10 times as great as a diameter 52.

The effect of the higher fluid turbulence levels first increases the available contact surface area by production of smaller water droplets and more rapid movement of the individual droplets within the jetted stream, and second, it increases the heat transfer level between the fluids (heat transfer increases approximately to the turbulence velocity to the power of 3). The greatly increased heat transfer within the fluid stream allows the volatile fraction of the liquid to gain enough heat energy to overcome the latent heat requirement for vaporization. The increased turbulence levels within the nozzles also more efficiently mixes the heat energy generated from the static pressure loss within the bore as the fluid passes through the nozzles. This also assists in the vaporization process.

As best shown in FIG. 4, the nozzles include a radius style entrance 54 and an exit 56 that is normal or perpendicular to the angle of the nozzle. These changes in design result in increased velocity through the nozzle by increasing the discharge coefficient, less power is lost through friction loss within the nozzle.

An alternative embodiment of the contacting device is illustrated at 100 in FIG. 7 where it is seen that the construction of a contacting chamber 102 comprises a plurality of annular members or rings 104 that abut each other in engaging relation so as to form a cylinder. A seal means 106 such as an O-ring is provided between each of the ring members 104 to prevent any leakage therebetween. A first ring member 108 has a shoulder 110 formed thereon which abuts against an inside end wall 112 of a jacket member 114. This first ring member has a completely solid wall. All subsequent ring members 104 have a plurality of nozzles 116 extending therethrough of the shape and orientation described above with respect to FIGS. 4–6. A final ring member 118 engages against an interior surface 120 of the jacket 114 and abuts against an end wall 122 of an outlet member 124 which has a radially extending flange 126 adjacent to the end wall 122. Appropriate fastening means 128 such as threaded fasteners extend through the flange 126 into the jacket 114 to clampingly retain all of the ring members 104 in the stacked relationship as described.

Such a construction as illustrated in FIG. 7 greatly facilitates the manufacture of the contacting chamber 102 and particularly facilitate the machining of the nozzles 116.

By utilizing a heater 25 for the liquid, as shown in FIG. 1, the effectiveness of the stripping procedure for some species is enhanced and, since the solubility of gas in a liquid is decreased as the temperature is increased, heating of the liquid is preferred. It is also possible to instead, heat the air being supplied to the inlet 12. In FIG. 3, an air heating means 40 is provided upstream of the air inlet 12 and, is illustrated as being in the form of an electrical resistance heater. Any other type of air heating means could also be used.

Thus, it is seen that the present invention provides a method for removing contaminants from a liquid supply at efficiencies significantly higher than attained by the previously mentioned U.S. Pat. No. 4,761,077 by supplying a stream of liquid, having contaminants therein to be removed, to a contacting chamber, producing a continuous stream of air to the contacting chamber and turbulently mixing the air and liquid within the contacting chamber while allowing for separation of the contaminants from solution in the discharge outlet 18 by reduction of the partial pressure of the gas. Preferably the air and liquid streams continuously flow through the contacting chamber and are directed to flow generally in the same direction within the contacting chamber and the liquid is supplied to the contacting chamber under pressure to cause the air to be aspirated into the contacting chamber. It is also possible to supply liquid streams to the contacting chamber in discrete batches rather than a continuous flow, particularly if the volume of liquid to be treated is not sufficient to treat in a continuous manner.

The volume of air supplied to the contacting chamber is several times the volume of supplied liquid. If desired, the liquid may be preheated prior to being supplied to the contacting chamber, although it could be the air which is preheated, if either is preheated. This air stripping of the contaminants from the liquid stream could be performed either on a continuous basis or with small flow volumes on a batch basis. Further, a stream of reagent material may also be supplied to the contacting chamber to enhance the effectiveness of contaminant removal.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A system for removing dissolved gases and volatile organic chemicals from a liquid comprising:

a source of liquid having contaminants therein to be removed;

means for pressurizing said liquid;

a contacting chamber having an inlet opening open to atmosphere and a discharge opening; and means for introducing said pressurized liquid through a plurality of passages open to said contacting chamber so as to cause air to be aspirated into said contacting chamber through said inlet opening such that an enhanced turbulent mixing of said air and water occurs in said contacting chamber;

said passages being axially angled to the centerline of said contacting chamber and having a length to diameter ratio of at least 10 to 1.

2. A system according to claim 1, wherein said passages include an entrance progressively decreasing in diameter in a direction toward said chamber.

3. A system according to claim 1, wherein said passages have an exit that is perpendicular to an axis of the passage.

4. A system according to claim 1, wherein at least some of said passages are skewed to a centerline of the contacting chamber.

5. A system according to claim 1, wherein said contacting chamber is surrounded by a jacket which forms an annular chamber communicating with said passages.

6. A system according to claim 1, wherein said contacting chamber is cylindrical and said passages communicate with said chamber circumferentially around said chamber.

7. A system according to claim 1, wherein said air stream and said liquid stream are directed to flow generally in the same direction within said contacting chamber.

8. A system according to claim 1, including means for aspirating a volume of air into said contacting chamber in excess of 15 times the volume of supplied liquid.

9. A system according to claim 1, wherein said contacting chamber is comprised of a plurality of individual ring members held together by means of an outer jacket.

10. A method for removing dissolved gases and volatile organic chemicals from a liquid comprising:

supplying a stream of pressurized liquid having contaminants therein to be removed to a contacting chamber having an inlet opening open to atmosphere and a discharge opening lying along an axis of said chamber; and introducing said pressurized liquid through a plurality of passages having a length to diameter ratio of at least 10 to 1 open to said contacting chamber in the form of individual jets directed in an axial, angled direction perpendicular to the axis to form large surface areas in the liquid phase and turbulently mixing the liquid within said jets so as to cause air to be aspirated into said contacting chamber through said inlet opening in a manner to enhance a turbulent mixing of said air and liquid in said contacting chamber.

11. A method according to claim 10, wherein said air is aspirated is said axial direction in volumetric amounts in excess of 15 to 1, air to liquid.

12. A method of removing dissolved gases and volatile organic compounds from liquid comprising:

supplying a stream of liquid, having at least one of dissolved gases and volatile organic compounds therein to be removed, to a contacting chamber;

supplying a stream of air to said contacting chamber;

introducing said liquid into said contacting chamber through a plurality of passages having a length to diameter ratio of at least 10 to 1 in the form of cone shaped liquid jets;

enhancing a turbulent mixing of the liquid within the individual jets; and enhancing a turbulent mixing of said air and liquid within said contacting chamber.

13. A method according to claim 12, wherein said air stream and said liquid stream are directed to flow generally in the same direction within said contacting chamber.

14. A method according to claim 12, wherein said liquid is supplied to said contacting chamber under pressure.

15. A method according to claim 12, wherein said air is aspirated into said contacting chamber.

16. A method according to claim 12, wherein the volume of air aspirated into said contacting chamber is in excess of 15 times the volume of supplied liquid.

17. A method according to claim 12, wherein said streams of liquid and air continuously flow through said contacting chamber.

18. A method according to claim 12, wherein said stream of liquid is passed through said contacting chamber more than once to contact uncontaminated air.

19. A method according to claim 12, wherein said streams of liquid and air are supplied to said contacting chamber in discrete batches.

* * * * *